United States Patent
Witriol et al.

(10) Patent No.: US 8,572,028 B2
(45) Date of Patent: *Oct. 29, 2013

(54) SYNCHRONIZING STRUCTURED WEB SITE CONTENTS

(75) Inventors: Daniel B. Witriol, Redmond, WA (US); Jorge M. Ferreira, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

This patent is subject to a terminal disclaimer.

(21) Appl. No.: 12/871,831

(22) Filed: Aug. 30, 2010

(65) Prior Publication Data

US 2011/0087802 A1 Apr. 14, 2011

Related U.S. Application Data

(63) Continuation of application No. 11/438,176, filed on May 22, 2006, now Pat. No. 7,792,792.

(51) Int. Cl.
*G06F 17/30* (2006.01)
(52) U.S. Cl.
USPC .......................................... 707/610; 709/219
(58) Field of Classification Search
CPC .................... G06F 17/30575; G06F 17/30286; G06F 17/30067
USPC ............................ 707/610, 999.201; 709/219
See application file for complete search history.

(56) References Cited

U.S. PATENT DOCUMENTS

| | | | |
|---|---|---|---|
| 5,787,262 A | 7/1998 | Shakib et al. | |
| 6,188,999 B1 * | 2/2001 | Moody | 706/11 |
| 6,256,634 B1 * | 7/2001 | Moshaiov et al. | 1/1 |
| 6,341,291 B1 | 1/2002 | Bentley et al. | |
| 6,477,543 B1 | 11/2002 | Huang et al. | |
| 6,643,669 B1 * | 11/2003 | Novak et al. | 1/1 |
| 6,650,348 B2 | 11/2003 | Mariani et al. | |
| 6,658,476 B1 * | 12/2003 | Van | 709/230 |
| 6,711,151 B1 * | 3/2004 | Ziegler | 370/350 |
| 6,810,405 B1 * | 10/2004 | LaRue et al. | 707/613 |
| 6,877,137 B1 | 4/2005 | Rivette et al. | |
| 6,944,651 B2 | 9/2005 | Onyon et al. | |
| 6,952,758 B2 | 10/2005 | Chron et al. | |
| 6,976,077 B1 | 12/2005 | Lehew et al. | |
| 6,981,062 B2 | 12/2005 | Suryanarayana | |
| 7,000,032 B2 | 2/2006 | Kloba et al. | |

(Continued)

FOREIGN PATENT DOCUMENTS

| | | |
|---|---|---|
| EP | 1291770 | 3/2003 |
| JP | 2004094928 | 3/2004 |

(Continued)

OTHER PUBLICATIONS

Pabla, C., "SyncML intensive: a beginners look at SyncML protocol and procedures", Apr. 1, 2002, 9 pages.*

(Continued)

*Primary Examiner* — Phuong Thao Cao
(74) *Attorney, Agent, or Firm* — Merchant & Gould P.C.

(57) ABSTRACT

Techniques to synchronize structured web site content are described. An apparatus may include a server having a server synchronization module to identify structured content types shared by the server and a client, and synchronize structured content corresponding to the structured content types. Other embodiments are described and claimed.

14 Claims, 4 Drawing Sheets

(56) References Cited

U.S. PATENT DOCUMENTS

| | | | |
|---|---|---|---|
| 7,007,003 B1* | 2/2006 | Rybicki | 707/613 |
| 7,032,033 B1* | 4/2006 | Ledoux et al. | 709/248 |
| 7,076,736 B2* | 7/2006 | Hugh | 715/743 |
| 7,243,346 B1* | 7/2007 | Seth et al. | 717/163 |
| 7,389,515 B1* | 6/2008 | Seth et al. | 719/320 |
| 7,424,477 B1* | 9/2008 | Martin et al. | 1/1 |
| 7,472,116 B2 | 12/2008 | Dettinger et al. | |
| 7,571,194 B2* | 8/2009 | Mettala et al. | 1/1 |
| 7,792,792 B2 | 9/2010 | Witriol et al. | |
| 7,860,825 B2* | 12/2010 | Chatterjee et al. | 707/610 |
| 8,131,816 B2* | 3/2012 | Robinson et al. | 709/217 |
| 8,219,643 B2* | 7/2012 | Nakano et al. | 709/219 |
| 8,255,464 B2* | 8/2012 | Wilkins | 709/206 |
| 8,266,316 B2* | 9/2012 | Choi et al. | 709/232 |
| 2001/0056341 A1* | 12/2001 | Pennello et al. | 703/22 |
| 2002/0059280 A1 | 5/2002 | Slesinsky | |
| 2002/0059465 A1 | 5/2002 | Kim | |
| 2002/0099727 A1* | 7/2002 | Kadyk et al. | 707/201 |
| 2002/0108091 A1* | 8/2002 | Flanagin et al. | 714/798 |
| 2002/0188936 A1 | 12/2002 | Bojanic et al. | |
| 2003/0046434 A1* | 3/2003 | Flanagin et al. | 709/248 |
| 2003/0063134 A1 | 4/2003 | Lord et al. | |
| 2003/0117434 A1* | 6/2003 | Hugh | 345/744 |
| 2003/0130984 A1 | 7/2003 | Quinlan et al. | |
| 2003/0236820 A1 | 12/2003 | Tierney et al. | |
| 2004/0111642 A1* | 6/2004 | Peles | 713/201 |
| 2004/0215669 A1* | 10/2004 | Mettala et al. | 707/201 |
| 2005/0010614 A1 | 1/2005 | Ting et al. | |
| 2005/0015461 A1 | 1/2005 | Richard et al. | |
| 2005/0025117 A1* | 2/2005 | Inagaki et al. | 370/350 |
| 2005/0044187 A1 | 2/2005 | Jhaveri et al. | |
| 2005/0044530 A1 | 2/2005 | Novik | |
| 2005/0060355 A1 | 3/2005 | Kadyk et al. | |
| 2005/0132359 A1* | 6/2005 | McGuire et al. | 717/175 |
| 2005/0138122 A1 | 6/2005 | Boehringer et al. | |
| 2005/0165778 A1 | 7/2005 | Obata et al. | |
| 2005/0177617 A1* | 8/2005 | Banginwar et al. | 709/203 |
| 2005/0198189 A1* | 9/2005 | Robinson et al. | 709/217 |
| 2005/0210526 A1 | 9/2005 | Levy et al. | |
| 2005/0228812 A1 | 10/2005 | Hansmann et al. | |
| 2005/0235019 A1* | 10/2005 | Yang | 707/204 |
| 2005/0240512 A1* | 10/2005 | Quintero et al. | 705/37 |
| 2006/0031587 A1* | 2/2006 | Paterson et al. | 709/248 |
| 2006/0036488 A1 | 2/2006 | Golan et al. | |
| 2006/0041600 A1 | 2/2006 | Lehtola et al. | |
| 2006/0041893 A1 | 2/2006 | Castro et al. | |
| 2006/0106937 A1* | 5/2006 | Shields et al. | 709/228 |
| 2006/0112179 A1* | 5/2006 | Baumeister et al. | 709/226 |
| 2006/0168642 A1* | 7/2006 | Tachizawa et al. | 726/2 |
| 2006/0209794 A1 | 9/2006 | Bae et al. | |
| 2006/0215654 A1 | 9/2006 | Sivakumar et al. | |
| 2006/0236325 A1* | 10/2006 | Rao et al. | 719/315 |
| 2006/0288053 A1* | 12/2006 | Holt et al. | 707/203 |
| 2007/0016632 A1* | 1/2007 | Schulz et al. | 707/204 |
| 2007/0073787 A1* | 3/2007 | Tysowski et al. | 707/201 |
| 2007/0094334 A1* | 4/2007 | Hoffman et al. | 709/206 |
| 2007/0180194 A1* | 8/2007 | Graham et al. | 711/133 |
| 2007/0185898 A1 | 8/2007 | Hekmatpour et al. | |
| 2007/0214279 A1* | 9/2007 | Choi et al. | 709/231 |
| 2007/0226658 A1* | 9/2007 | Virk | 715/864 |
| 2007/0266118 A1* | 11/2007 | Wilkins | 709/219 |
| 2007/0271309 A1* | 11/2007 | Witriol et al. | 707/201 |
| 2007/0277231 A1* | 11/2007 | Medvinsky et al. | 726/5 |
| 2009/0055473 A1* | 2/2009 | Synnergren | 709/204 |

FOREIGN PATENT DOCUMENTS

| | | |
|---|---|---|
| KR | 2001/0094095 | 10/2001 |
| RU | 2250490 | 4/2005 |
| WO | 02/27540 A1 | 4/2002 |
| WO | 02077860 | 10/2002 |
| WO | 2005/116892 A1 | 12/2005 |

OTHER PUBLICATIONS

SyncML, "SyncML Device Information DTD", IBM, Version 1.0, 2000, 33 pages.*

Cover, Robin, Editor, "The SyncML Initiative," Dec. 3, 2002, Retrieved from the Internet on Dec. 10, 2008, <URL: http://xml.coverpages.org/syncML.html>, [38 pp.].

Examiner's First Report, dated May 19, 2011, issued in Australian Application No. 2007267994, [2 pp.].

First Office Action, dated Nov. 20, 2009, issued in Chinese Application No. 200780019071.4, [8 pp.].

International Search Report and Written Opinion of the International Searching Authority, dated Nov. 15, 2007, issued in PCT/US2007/012283, [8 pp].

Notice of Grant of Patent Right for Invention, dated Oct. 21, 2010, issued in Chinese Application No. 200780019071.4, [4 pp.].

Official Action of Formal Examination, dated Feb. 12, 2009, issued in Russian Application No. 2008146060, [3 pp.].

Pabla, Chandandeep, "SyncML intensive," Retrieved from the Internet on Apr. 1, 2002, <URL: http:/www-128.ibm.com/developerworks/xml/library/wi-syncm12/>, [9 pp.].

Patil, Aashish, "Sync traps," Sep. 1, 2001, Retrieved from the Internet: <URL: http://www-128.ibm.com/developerworks/library/wi-trap.html>, [6 pp.].

Response to First Office Action, dated Mar. 22, 2010, issued in Chinese Application No. 200780019071.4, [21 pp.].

Response to Official Action, dated Jun. 3, 2009, issued in Russian Application No. 2008146060, [7 pp.].

Translation of Russian Decision on Grant of a Patent for Invention, issued in Russian Application No. 2008146060, mailed Mar. 29, 2011, [7 pp.].

Yee, Wai Gen et al. "Scalable Synchronization of Intermittently Connected Database Clients," <URL: http://ir.iit.edu/~waigen/proj/osdb/paper.pdf>, [5 pp.].

Australian NOA in Patent Application No. 2007/267994 dated Dec. 21, 2011, 2pgs.

Chinese Office Action issued in Application No. 200780019071.4, dated Nov. 20, 2009, 8 pgs.

Chinese NOA issued in 200780019071.4, dated Oct. 21, 2010, 4 pgs.

EU Extended Search issued in Application No. 07795227.3-1225/2024866 PCT/US2007012283, dated Apr. 5, 2012, 8 pgs.

Russian NOA issued in Application 2008146060 on Mar. 24, 2011, 7pgs.

Russian OA issued in Application 2008146060 on Feb. 16, 2009, 3pgs.

SyncML Data Sync Protocol, XP-002375712, Version 1.2—Jun. 1, 2004, 78 pgs.

US Office Action cited in U.S. Appl. No. 11/438,176 mailed Aug. 22, 2008, 22 pgs.

US Office Action cited in U.S. Appl. No. 11/438,176 mailed Mar. 18, 2009, 28 pgs.

US Office Action cited in U.S. Appl. No. 11/438,176 mailed Sep. 23, 2009, 30 pgs.

U.S. Appl. No. 11/438,176, Response and Amendment filed Dec. 22, 2008, 13 pgs.

U.S. Appl. No. 11/438,176, Amendment and Response filed Jun. 18, 2009, 15 pgs.

U.S. Appl. No. 11/438,176, Amendment and Response filed Jan. 25, 2010, 13 pgs.

U.S. Appl. No. 11/438,176, NOA mailed May 3, 2010, 17 pgs.

Chinese Application 201110021533.4, Notice on the Third Office Action mailed Jun. 25, 2013, 9 pages.

* cited by examiner

SYNCHRONIZING STRUCTURED WEB SITE CONTENTS

CROSS-REFERENCE TO RELATED APPLICATION

This application is a continuation of, and claims priority to, U.S. patent application Ser. No. 11/438,176, filed May 22, 2006, entitled "SYNCHRONIZING STRUCTURED WEB SITE CONTENTS," and issued as U.S. Pat. No. 7,792,792 on Sep. 7, 2010. The disclosure of the above-identified application is hereby incorporated by reference in its entirety as if set forth herein in full.

BACKGROUND

Network software applications typically maintain a centralized network database for application and/or user data. In some cases, a device may download or replicate a subset of the central database from the network database, and then disconnect from the network. For example, a wireless handheld device may download calendar and contact information from a central database such as a web site. If information maintained by the network database is modified, or the replicated subset of information itself is modified, a synchronization event may be needed to update such changes in both data locations. For example, assume a user adds a new appointment to a calendar application. When the handheld device establishes a connection with the network database, the calendar information stored by the network database may need to be updated to reflect the modified data from the handheld device, and vice-versa. As the volume of application data increases, as well as the number of devices attempting to synchronize with the network database, however, synchronization events may become increasingly time and bandwidth intensive. Consequently, improved synchronization techniques may be needed to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to techniques for synchronizing structured content between physical or logical entities. More particularly, various embodiments may be directed to synchronization techniques between a client and server. In some embodiments, for example, certain structured content types shared between the server and the client may be identified prior to synchronization operations. Structured content corresponding to the structured content types may then be synchronized once identified. In this manner, synchronization may be focused on shared structured content as identified by the structured content types, rather than the entire set of data stored by the client and/or server. Accordingly, synchronization time and resources may be reduced, thereby enhancing overall device operations and network services for a user.

In one embodiment, a client may perform discovery or identification operations. For example, the server may receive a request for a server content list. The server may retrieve and send the server content list with structured content values representing structured content types supported by the server. A client may receive the server content list, and compare the server content list with a client content list having structured content values representing structured content types supported by the client. The client may send a synchronization request and/or a shared content list to synchronize structured content types supported by the server and the client. The server may receive the synchronization request and/or shared content list, and perform synchronization operations accordingly.

In one embodiment, a server may perform discovery or identification operations. For example, the server may receive the client content list. The server may retrieve the server content list, and compare both content lists. The server may generate a shared content list having structured content values representing structured content types supported by the client and the server in accordance with the comparison. The server may send the shared content list to the client. The client may receive the shared content list, and send a synchronization request to synchronize structured content types in accordance with the shared content list. The server may receive the synchronization request and perform synchronization operations in accordance with the synchronization request. Other embodiments are described and claimed.

DETAILED DESCRIPTION

Figure 1:
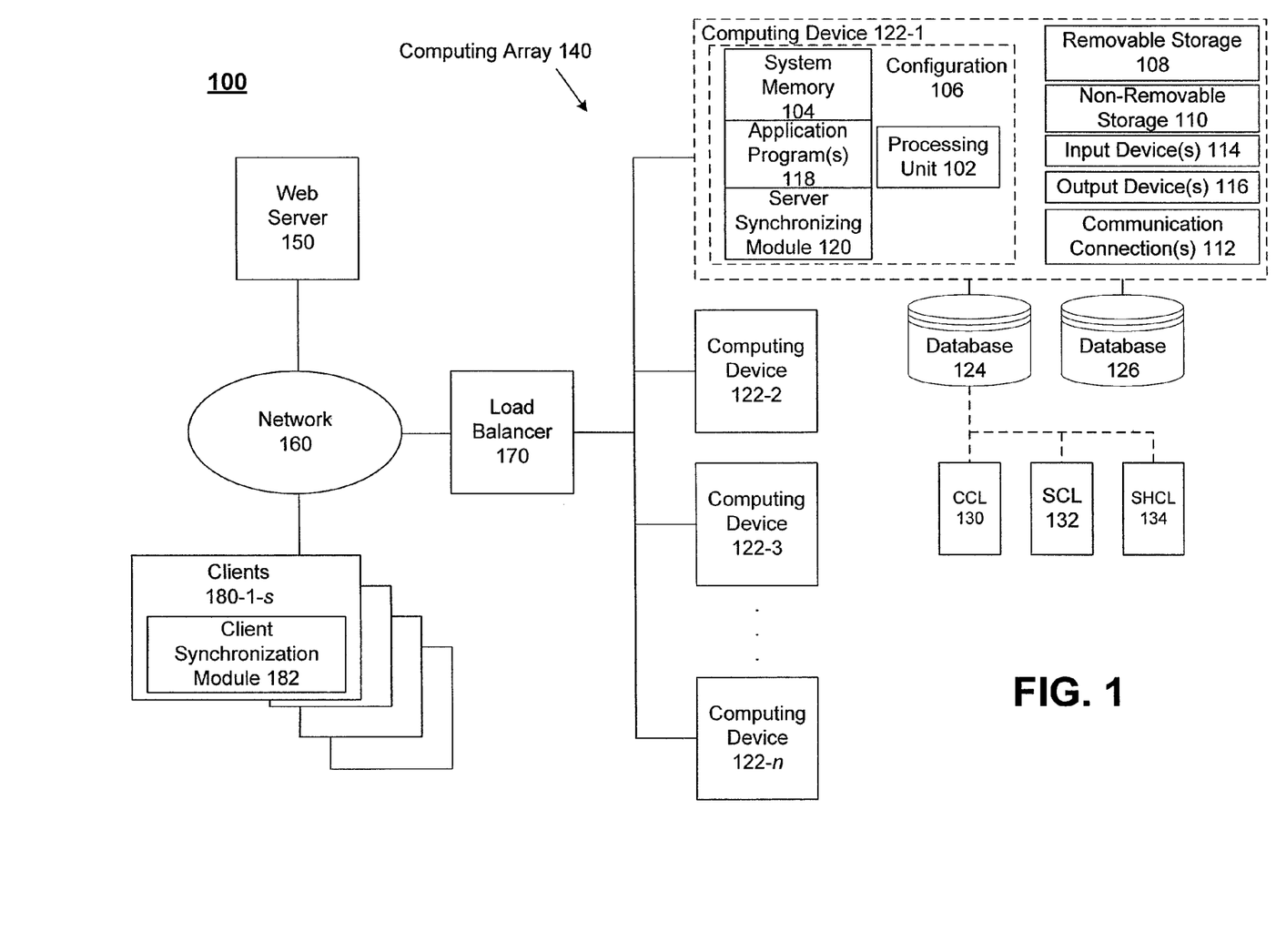
FIG. 1 illustrates an exemplary embodiment of a network.

FIG. 1 illustrates one exemplary embodiment of a network. FIG. 1 illustrates a block diagram for a network 100. Network 100 may represent a general network architecture suitable for implementing various embodiments. Network 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although network 100 as shown in FIG. 1 has a limited number of elements in a certain topology, it may be appreciated that network 100 may include more or less elements in alternate topologies as desired for a given implementation. The embodiments are not limited in this context.

As shown in FIG. 1, for example, network 100 may comprise various elements such as a computing array 140, a server 150, a network 160, a load balancer 170, and client devices 180-1-s. In one embodiment, for example, server 150 may be implemented as a web server. A web server may comprise a computing device capable of accepting Hypertext Transfer Protocol (HTTP) requests from client devices (e.g., clients 180-1-s and/or computing devices 122-1-n) to serve web pages. Web pages are typically documents generated using some form of markup language, such as the Hypertext Markup Language (HTML), the Extensible Markup Language (XML), Extensible Hypertext Markup Language (XHTML), MICROSOFT WORD® Markup Language (WordML), and so forth. Network 160 may comprise a packet network using one or more Internet Protocols, such as the Transmission Control Protocol and Internet Protocol (TCP/IP). Load balancer 170 may comprise a device to assign work loads to a set of networked computer servers (e.g., computing array 140) in such a manner that the computing resources are used in an efficient manner. Load balancer 170 may be implemented using, for example, a computer, a server, a virtual server, a network appliance, and so forth.

In various embodiments, network 100 may include various computing devices. In one embodiment, for example, computing array 140 may include multiple computing devices 122-1-n. Similarly, client devices 180-1-s may also be implemented as various types of computing devices. Examples of computing devices may include, but are not necessarily limited to, a computer, a computer system, a computer subsystem, a workstation, a terminal, a server, a web server, a virtual server, a personal computer (PC), a desktop computer, a laptop computer, an ultra-laptop computer, a portable computer, a handheld computer, a personal digital assistant (PDA), a mobile computing device, a cellular telephone, a combination cellular telephone/PDA, a digital video device (e.g., digital camera, video camera, or camcorder), a digital audio device (e.g., MP3 player), a one-way pager, a two-way pager, virtual instantiations of any of the previous examples, and any other electronic, electromechanical, or electrical device. The embodiments are not limited in this context.

In one embodiment, for example, computing array 140 may be implemented as a server farm, wherein computing devices 122-1-n each represent a server, virtual server, virtual machine, single board computer (SBC), server blade, web server, and so forth. A server farm is typically a collection of computer servers usually maintained by an enterprise to accomplish server needs beyond the capability of one machine. Often, server farms will have both a primary and a backup server allocated to a single task, so that in the event of the failure of the primary server, a backup server will take over the functions of the primary server. Server farms are commonly used, for example, to provide web hosting services. A web hosting service is a type of Internet hosting service that provides individuals and organizations with online systems for storing information, images, video, audio, text, animations, movies, pictures, or any other form of web content accessible via the World Wide Web (WWW or "web"). Web hosts are companies that provide space on a server they own for use by their clients as well as providing Internet connectivity, typically in a data center. Web hosts can also provide data center space and connectivity to the Internet for servers they do not own to be located in their data center.

FIG. 1 further illustrates a more detailed block diagram of computing device 122-1. Computing device 122-1 may be representative of any computing devices 122-1-n. Furthermore, computing device 122-1 may also be representative of any client device 180-1-s. In its most basic configuration 106, computing device 122-1 typically includes at least one processing unit 102 and memory 104. Memory 104 may be implemented using any machine-readable or computer-readable media capable of storing data, including both volatile and non-volatile memory. For example, memory 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 1, memory 104 may store various software programs, such as one or more application programs 118, a server synchronization module 120, and accompanying data.

Computing device 122-1 may also have additional features and/or functionality beyond configuration 106. For example, computing device 122-1 may include removable storage 108 and non-removable storage 110, which may also comprise various types of machine-readable or computer-readable media as previously described. Computing device 122-1 may also have one or more input devices 114 such as a keyboard, mouse, pen, voice input device, touch input device, and so forth. One or more output devices 116 such as a display, speakers, printer, and so forth may also be included in computing device 122-1 as well.

Computing device 122-1 may further include one or more communications connections 112 that allow computing device 122-1 to communicate with other devices. Communications connections 112 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Each of computing devices 122-1-n may include multiple databases. As shown in detail with respect to computing device 122-1, computing device 122-1 may be coupled to databases 124, 126. Each database may be arranged to store various types of data for computing device 122-1, application programs 118, server synchronization module 120, and so forth. In one embodiment, for example, database 124 may store a client content list 130, a server content list 132, a shared content list 134, and so forth. Client content list 130 may include structured content values representing structured content types supported by a client, such as one or more clients 180-1-s. Server content list 132 may include structured content values representing structured content types supported by a server, such as one or more servers 122-1-*n*. Shared content list 134 may include structured content values representing structured content types shared by one or more clients 180-1-*s* and one or more servers 122-1-*n*. Other types of data and databases may be implemented with computing device 122-1, and the embodiments are not limited in this context.

In general operation, network 100 may facilitate synchronization operations between one or more application programs stored or executed by one or more computing devices 122-1-*n* of computing array 140, and one or more application programs stored or executed by one or more client devices 180-1-*s*. Assume computing device 122-1-*n* each implements one or more application programs 118, such as a server-based web application program. Examples of server-based web application programs may include WINDOWS® SHAREPOINT® SERVICES (WSS) Version 2.0, Version 3.0, and variants, made by MICROSOFT® Corporation (collectively referred to herein as "WSS application" or "SharePoint application"). WSS Version 3.0 is a suite of integrated application programs that provides basic team services, web portal and intranet functionality for various clients, such as clients 180-1-*s*, for example. User data or content data for WSS Version 3.0 may be stored by databases 124, 126. Furthermore, one or more computing devices 122-1-*n* may implement a third party application built on top of WSS Version 3.0, such as SharePoint Portal Server (SPS) 2003 or Office SharePoint Services (OSS) 2006, for example. Although some embodiments may be described with reference to a WSS application program and accompanying third party programs by way of example, it may be appreciated that any application program executed by a single or multiple computing devices may be synchronized using the synchronization techniques described herein. The embodiments are not limited in this context.

WSS Version 3.0 provides a platform for multiple users to share data in an efficient manner. For example, users may be organized into teams, with each team having a shared calendar, contact list, task list, emails, discussion boards, documents, and so forth. In an effort to increase usability of such shared data, various elements of network 100 may be organized as an intermittently synchronized database system (ISDB). An ISDB allows various physical or logical client entities to download or replicate portions of the information from databases 124, 126 to a client device, such as client device 180-1, for example. Assume client device 180-1 includes an application such as MICROSOFT OUTLOOK®, made by Microsoft Corporation. Microsoft Outlook may import shared data from server 122-1 as maintained using WSS Version 3.0. Consequently, a user may have a portable device such as a handheld computing device executing a local version of Microsoft Outlook, and download portions of shared data from server 122-1. Client device 180-1 may modify the locally replicated data without a constant connection to server 122-1 (e.g., offline), such as by adding appointments, deleting a contact, modifying a task, generating a note, updating a project timeline, and so forth. Meanwhile, other users may also modify the locally replicated data from databases 124, 126 as well. To maintain data integrity, client device 180-1 may need to periodically or intermittently synchronize with server 122-1 to reflect changes to any structured content or data sets shared between both devices.

To perform synchronization operations, each client device 180-1-*s* may include a client synchronization module 182, and each server 122-1-*n* may include a server synchronization module 120. Synchronization modules 120, 182 may having varying levels of integration to allow a server 122 and a client device 180, respectively, to synchronize structured content or data sets supported by both devices. In one embodiment, for example, a client device 180 may include a Microsoft Outlook client application integrated at some level with a WSS application as executed by a server 122. Such integration may include synchronizing data between Microsoft Outlook and the WSS application. For example, the WSS application may include a shared calendar, contacts, tasks, email, and discussion boards stored in the WSS application. Various embodiments may define a user model, drivers, specifications, data schemas, and synchronization infrastructure for Microsoft Outlook users to interact with WSS application data. Although some embodiments may be described as synchronizing structured content between Microsoft Outlook and a WSS application by way of example only, it may be appreciated that the synchronization of structured content may be implemented for any application programs and computing platforms as desired for a given set of design parameters and performance constraints. The embodiments are not limited in this context.

There are several design considerations when attempting to synchronize two or more applications and/or devices, such as server 122-1 and client device 180-1. For example, to use a web site as a central data repository, data should be synchronized to other applications quickly while generating minimal load on the web site servers. Further, users are often only interested in a small scope of the overall data, and therefore users need easily discoverable places to start synchronization operations for the relevant data of interest. In addition, different synchronization clients may only be capable of synchronizing with particular types of data from a server. Similarly, some synchronization clients may support data types or values not supported by the web site server, while the web site server may support data types or values not supported by the synchronization clients. In another example, the web site and synchronization client may be running in different languages. In yet another example, multiple synchronization clients may potentially update the same data while not connected to the server, and therefore measures need to be taken to ensure that data is not lost during synchronization events. In still another example, users may need to synchronize with the same web site both inside private networks and a public network, such as the Internet. In yet another example, clients synchronizing content from a server cannot accurately predict how often the content will change resulting in either extra load on the server or stale content on the synchronized client. Finally, server administrators want to be able to control the load generated on the server through synchronizing clients.

In an effort to solve these and other problems, server 122 and/or client device 180 may implement improved synchronization techniques utilizing structured content. Structured content may refer to any type of media content (e.g., text, audio, video, images, pictures, animation, symbols, characters, numbers, icons, and so forth) having one or more defined structural parameters, such as width, length, bit size, byte size, syntax, fields, values, codes, flags, and so forth. The structured content may include application data and/or user data to support any number of application programs, such as MICROSOFT OUTLOOK, MICROSOFT ACCESS®, MICROSOFT FRONTPAGE®, MICROSOFT ONENOTE®, MICROSOFT POWERPOINT®, MICROSOFT WORD, MICROSOFT VISIO®, a WSS application, a SPS application, and so forth. In one embodiment, for example, the structured content may include application data and/or user data for Microsoft Outlook, such as one or more items from a calendar list, a task list, a contact list, a note or memo list, a mail list, and so forth. Server synchronization module 120 and client synchronization module 182 may be integrated to identify structured content types shared between server 122 and client 180. Structured content information corresponding to the structured content types shared between server 122 and client 180 may then be synchronized.

Performing synchronization operations using structured content may provide several advantages over conventional synchronization techniques. In various embodiments, for example, initiating synchronization operations between devices may be improved in a number of ways. For example, a network address and/or hyperlink may be generated for a synchronization client to initiate synchronization operations based on certain content types supported by a server and/or client. Different hyperlinks may be generated to initiate synchronization operations to different scopes of content. In another example, synchronization operations may be initiated differently based on the amount of content being synchronized (e.g. synchronize only headers versus synchronizing entire content sets). In yet another example, a protocol handler may be used to initiate synchronization operations from a web browser.

Once synchronization operations have been initiated, various embodiments may improve how the content is actually synchronized. For example, a server-side change log may be used to synchronize only changed content. A token may be passed back and forth to get only new changes made since a previous synchronization event. In another example, synchronization operations may only support individually requested or defined fields in a structured schema. In yet another example, synchronization operations may support different hierarchical scopes such as those created in folder hierarchies. In still another example, synchronization views may be generated to display a filtered set of content determined by various field values. In yet another example, some embodiments may support synchronization of very large data sets using paging techniques. In another example, some embodiments may perform conflict detection and automatic resolution using a version history. In one more example, some embodiments may support synchronization of attachments using "E-Tags" for conflict resolution. In another example, some embodiments may support schema mismatches between the synchronizing web site and the client using a property bag. In a further example, some embodiments may support server/client language mismatches using field value mapping. In still another example, some embodiments may support reads and updates using a read/send/refresh pattern. Finally, some embodiments may provide the client with alternate universal resource locators (URLs) that it can synchronize with in order to access the web site from internal private networks or external public networks.

To further improve synchronization operations, various embodiments may improve timing issues regarding when to synchronize a client device with a web site. For example, some embodiments may manage client load and/or server load by providing recommended synchronization intervals to the synchronization client (e.g., client synchronizes every P minutes). The recommended synchronization intervals may represent a minimum synchronization interval, a maximum synchronization interval, or some value in between. The recommended synchronization intervals may be based on historical content change data stored on the server (e.g., grid synchronization), or based on results of previous synchronization requests from the client (e.g., exponential decay).

In order to synchronize structured content with server 122, a client device 180 may use a SharePoint.StssyncHandler ActiveX Control. This control is installed on client device 180 with Microsoft Outlook and indicates whether Microsoft Outlook is installed on client device 180 and able to synchronize a particular type of list. In WSS Version 3.0, for example, the types of list that may be synchronized include a calendar list, a contact list, a document list, a task list, discussion list, and others as well.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 2:
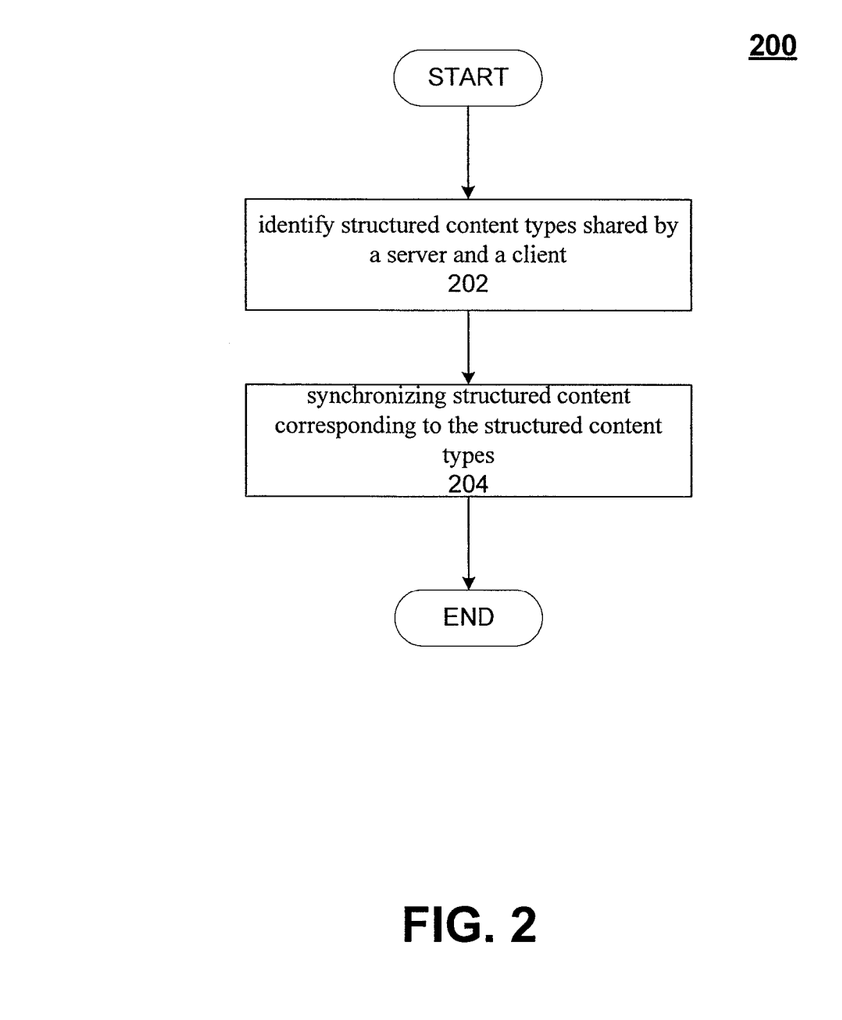
FIG. 2 illustrates an exemplary embodiment of a logic flow.

FIG. 2 illustrates one embodiment of a logic flow. FIG. 2 illustrates a logic flow 200. Logic flow 200 may be representative of the operations executed by one or more embodiments described herein, such as network 100, computing devices **122-1-*n*, and/or client devices 180-1-*s*. In some embodiments, for example, certain structured content types shared between the server and the client may be identified prior to synchronization operations at block 202. Structured content corresponding to the structured content types may then be synchronized once identified at block 204**. In this manner, synchronization may be focused on shared structured content as identified by the structured content types, rather than the entire set of data stored by the client and/or server. Accordingly, synchronization time and resources may be reduced, thereby enhancing overall device operations and network services for a user.

Figure 3:
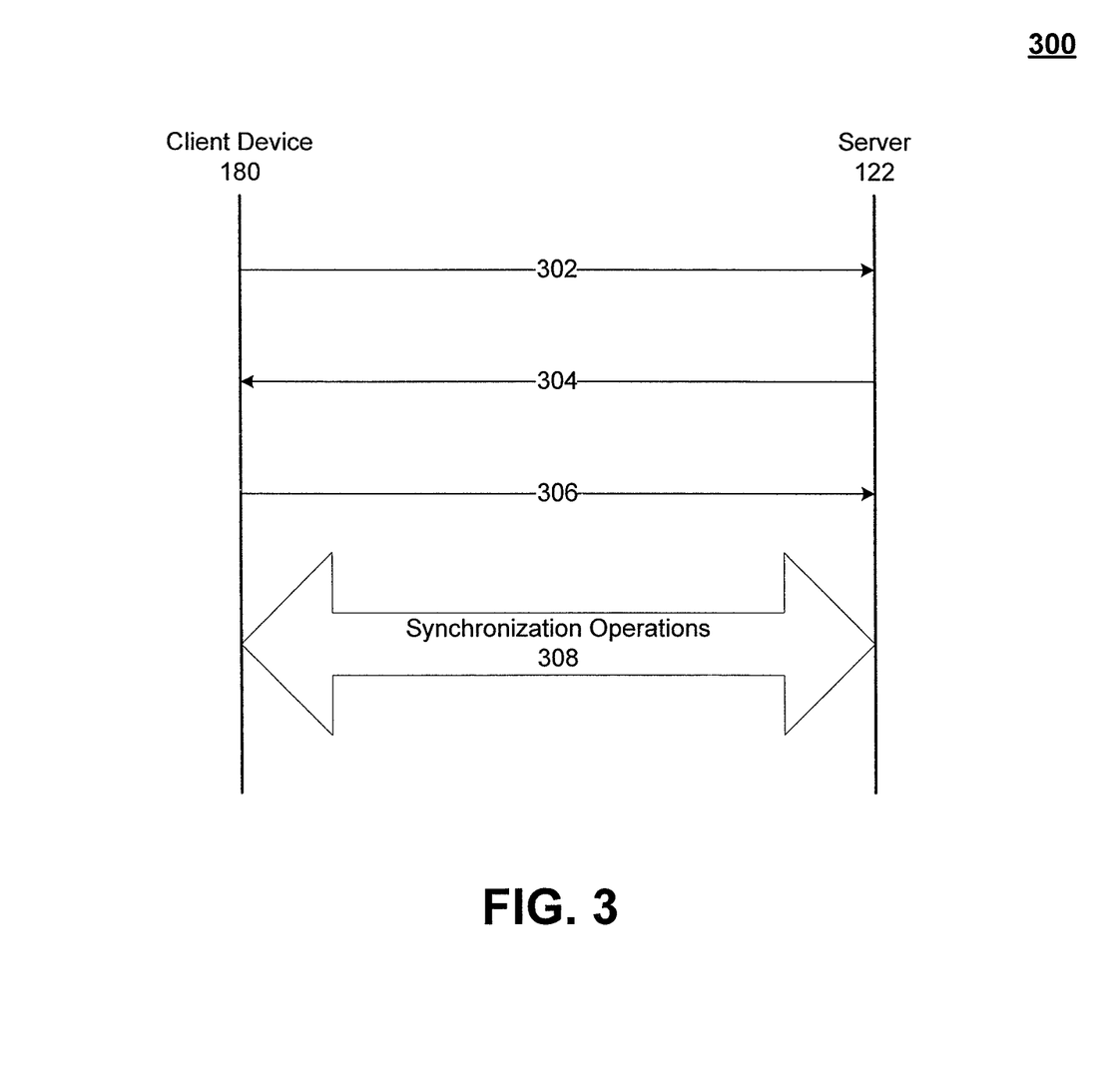
FIG. 3 illustrates an exemplary embodiment of a first message flow.

FIG. 3 illustrates one embodiment of a first message flow. FIG. 3 illustrates a message flow 300 where a client performs identification operations. As shown in FIG. 3, client device 180 may send a message 302 to server 122, with message 302 comprising a request for a server content list. Server 122 may receive message 302, and retrieve server content list 132 from database 124. Server 122 may send a message 304 to client device 180, with message 304 comprising server content list 132 with structured content values representing structured content types supported by server 122. Client device 180 may receive server content list 132, and retrieve a client content list 130. Client content list 130 may include structured content values representing structured content types supported by the client. Client device 180 may compare server content list 132 with client content list 130 to find matching content types. Client device 180 may generate a shared content list 134, and send message 306 to server 122. Message 306 may comprise a synchronization request and/or shared content list 134. Server 122 may receive message 306, and server 122 and client device 180 may begin synchronization operations to synchronize structured content types supported by server 122 and client 180 as indicated by arrow 308.

Figure 4:
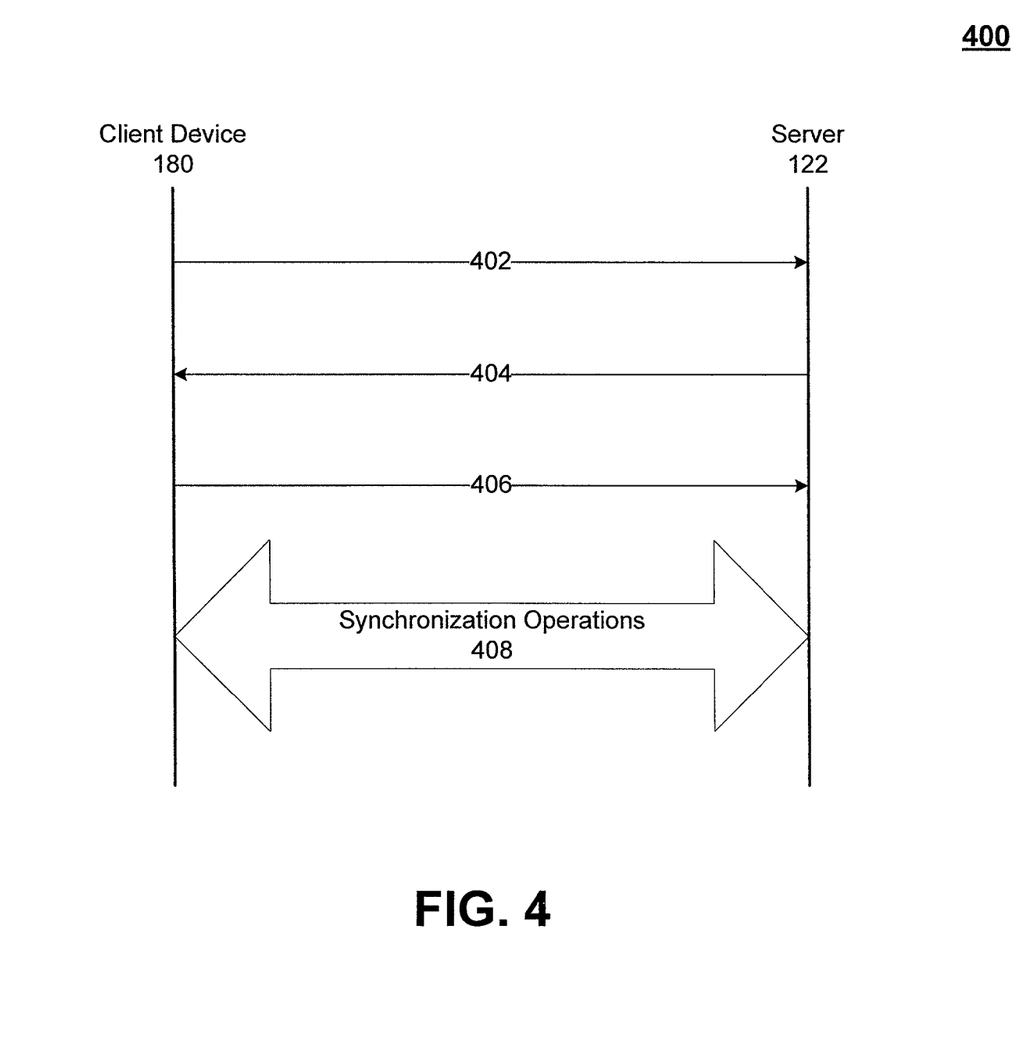
FIG. 4 illustrates an exemplary embodiment of a second message flow.

FIG. 4 illustrates one embodiment of a second message flow. FIG. 4 illustrates a message flow 400 where a server performs identification operations. As shown in FIG. 4, server 122 may receive client content list 130 via message 402. Server 122 may retrieve server content list 132, and compare both content lists. Server 122 may generate shared content list 134 having structured content values representing structured content types supported by client device 180 and server 122 in accordance with the comparison. Server 122 may send shared content list 134 to client device 180 via message 404. Client device 180 may receive shared content list 134, and send a synchronization request to synchronize structured content types in accordance with shared content list 134 via message

406. Server 122 may receive the synchronization request, and server 122 and client device 180 may perform synchronization operations in accordance with the synchronization request as indicated by arrow 408.

In various embodiments, initiating synchronization operations between devices may be improved in a number of ways. For example, a network address and/or hyperlink may be generated for a synchronization client to initiate synchronization operations based on certain content types supported by a server and/or client. Different hyperlinks may be generated to initiate synchronization operations to different scopes of content. In one embodiment, server synchronization module 120 may generate a hyperlink to send the synchronization request with at least one structured content type. As a result, a user may selectively synchronize certain structured content types with server 122 in a seamless manner.

In various embodiments, synchronization operations may be initiated differently based on the amount of content being synchronized. In one embodiment, for example, server synchronization module 120 may determine an amount of structured content to synchronize. Server synchronization module 120 may set synchronization parameters based on the determined amount. Server 122-1 may send synchronization information to client 180-1 in accordance with the synchronization parameters. For example, assume the structured content type is email messages. If the determined amount is a larger volume of email messages to be synchronized between server 122-1 and client 180-1, then server 122-1 may set a synchronization parameter to indicate that only email headers are to be initially synchronized rather than the entire email contents. Conversely, if the determined amount is a smaller volume of email messages, then server 122-1 may set a synchronization parameter to indicate that entire email contents are to be synchronized with client 180-1. In another example, assume the structured content type is documents. If the determined amount is a large volume of documents to be synchronized between server 122-1 and client 180-1, then server 122-1 may set a synchronization parameter to indicate that only certain portions of each document are to be initially synchronized rather than the entire body of each document. Conversely, if the determined amount is a smaller volume of documents, then server 122-1 may set a synchronization parameter to indicate that the entire contents of each document are to be synchronized with client 180-1. This same technique may also be applied by examining the overall size of a document, with a larger document having only a portion sent at a time and a smaller document being entirely sent in one transaction. These are merely a few examples, and other characteristics of the structured content type may be used to set the synchronization parameter.

In various embodiments, a protocol handler may be used to initiate synchronization operations from a web browser. Once shared structured content types have been identified, a web browser on client 180-1 may provide one or more URLs to initiate synchronization operations as previously described. To accomplish this, client synchronization module 182 may use a protocol handler to send different synchronization requests to server 122-1.

Once synchronization operations have been initiated, various embodiments may improve how the content is actually synchronized. For example, a server-side change log may be used to synchronize only changed content. In one embodiment, for example, server synchronization module 120 may receive a synchronization request to synchronize a certain structured content type. Server synchronization module 120 may determine whether the structured content indicated by the structured content type has been modified using a change log. Server 122-1 may send synchronization information to the client based on this determination.

With read/write synchronization, a defined technique is needed for Microsoft Outlook to synchronize changes from the WSS application. This may be accomplished using a change log and accompanying web-service APIs. For example, WSS version 3.0 supports a change log per virtual server, site and list. This will allow Microsoft Outlook the ability to poll specifically for added, edited, deleted, renamed and moved items. In addition, a web-service may be implemented to allow Microsoft Outlook to perform a bulk "get" of change log items.

Various embodiments may determine whether multiple versions of structured content have been independently modified using a version history. Some embodiments may perform conflict detection and automatic resolution using a version history. Version history is a mechanism that is used to automatically resolve a particular class of synchronization conflicts in peer-to-peer environments. In particular, it can automatically resolve conflicts that are the result of consistent sequential changes to an item.

By way of example, assume a first user synchronizes an item to a first client device 180-1, such as a desktop computer used at an office. The first user makes a few changes to the item, but does not copy those changes back to server 122-1. The first user synchronizes first client device 180-1 with a second client device 180-2, such as a PDA, and leaves the office for home. When the first user gets home, the first user synchronizes the second client device 180-2 with a third client device 180-3, such as a home PC. The first user makes further changes to the item before synchronizing it from the third client device 180-3 to server 122-1. The next day the first user goes to work and synchronizes first client device 180-1 with server 122-1. First client device 180-1 attempts to send the updated item it has to server 122-1, but server 122-1 detects a change to the item since a previous synchronization with first client device 180-1, and therefore raises a conflict. The conflict, however, is not a real conflict since the updated version of the item residing on server 122-1 already includes the change made on first client device 180-1 when the first user synchronized the third client device 180-3 with server 122-1. Some embodiments my use a version history to detect scenarios like this and automatically resolve the conflict.

In the above scenario, a single version number on the item may be insufficient to resolve the conflict. For example, what if the first user had not synchronized with server 122-1 from third client device 180-3. Rather, assume a second user made an unrelated change to the item. In this case, there really is a conflict. A single version number is insufficient to differentiate the two scenarios. The version history technique stores additional information to help resolve this problem.

In particular, the version history technique may be used to determine if there are multiple versions of an item (e.g., version A and version B), and whether one version include changes made in another version (e.g., does version B include the changes that were made in version A). In this case, text examination of the item in question may prove difficult and inaccurate. For example, consider a scenario where version B really did include changes from version A, however, one of the changes in version B was to remove a line added in version A.

The version history technique may be used to record a list of authors and an incrementing change number for each of them that indicates which change in sequence that they made. The "authors" in this case are computers represented by global user identifiers (GUIDs). A version history property may therefore comprise a concatenated list of GUIDs and change numbers, as follows:

{199A4AEA-A573-40CB-BB3C-7A66C0375104:1, 201B4AEA-A573-40CB-BB3C-7A66C0375104:2, 185D4AEA-A573-40CB-BB3C-7A66C0375104:3}

Each time a particular computing device edits a given item the appropriate synchronization module (e.g., synchronization modules 120 and/or 182) takes the last change number, increments it by one, and then writes it next to its GUID. A conflict is automatically resolved between version A and version B by comparing the highest change set for each version. The "highest change set" may comprise the GUID and number pair with the highest number. If the highest change set for version A is included in version B, and the highest change set for version B is not included in version A, then version B is newer and the conflict is resolved so that version B is the winner. If the highest change set for version A is not included in version B and the highest change set for version B is not included in version A, however, then version B does not include all edits made in version A. In this case the user will need to resolve the conflict manually.

Continuing with our previous example, assume the first user synchronizes an item down to first client device 180-1. Server synchronization module 120 may maintain a version history in database 124. Client synchronization module 182 may also maintain a version history on client device 180-1-s. At this point, the version history may appear as follows:

Version History: {Server_GUID:1}

The first user then edits the item on first client device 180-1. The version history may now appear as follows:

Version History: {Server_GUID:1, Work GUID: 2}

The first user synchronizes the item to second client device 180-2 and then from second client device 180-2 to third client device 180-3. Since there are no edits to the item, there is no corresponding change in the version history. The first user edits the item on third client device 180-3. The version history is updated as follows:

Version History: {Server_GUID:1, Work_GUID:2, Home_ GUID:3}

The first user synchronizes from third client device 180-3 to server 122-1.

The first user goes back to work the next day and synchronizes first client device 180-1 with server 122-1. Client synchronization module 182 on first client device 180-1 may have a version history as follows:

{ServerGUID:1, Work GUID:2}

Server synchronization module 120 on server 122-1 may have a version history as follows:

{ServerGUID:1, Work GUID:2, Home_GUID:3}

A comparison of the version histories for version A and version B reveals that the highest change set in A (Work_GUID:2) is included in version B but the highest change set for version B (Home_GUID:3) is not included in version A. Server synchronization module 120 therefore knows that version B includes all edits that were made to version A, but version A does not include all the changes that were made in version B. Version B is a superset of version A and hence wins the conflict.

Assume the first user never synchronized with server 122-1 from third client device 180-3, however, but rather the second user made a change to the item residing on server 122-1. The version history may be used to detect a conflict from this scenario. In this case, client synchronization module 182 of a fourth client device 180-4 may have the following version history:

{Server_GUID:1, Work GUID:2}

Meanwhile, server synchronization module 120 of server 122-1 may have the following version history:

{ServerGUID:1, User2_Work GUID:2}

A comparison of the version history for version A and version B now reveals that the highest change set in version A (Work_GUID:2) is not included in version B, and the highest change set in version B (User2_WorkGUID:2) is not included in version A. Therefore version B is not a superset of version A, version A is not a superset of version B, and server synchronization module 120 has detected a real conflict that needs to be resolved.

Various embodiments may detect data schema conflicts using a property bag. Some embodiments may support schema mismatches between a server 122 and a client 180 using a property bag. A property bag may refer to a set of field definitions for various data schemas used by application programs and/or devices. The property bag may be used to define fields on an as-needed basis rather than a fixed or hard-coded set of fields. For example, a Task schema for Microsoft Outlook as executed by a client device 180 may need certain fields not available by the WSS application of a server 122, and vice-versa. The property bag may be used to define fields for various lists or applications that may be used by both Microsoft Outlook and the WSS application on an ad-hoc basis. In this manner, schema mismatches between a server 122 and a client 180 may be corrected without necessarily having to update or modify the actual application programs executed by both devices.

Various embodiments may detect language conflicts using field value mapping. Some embodiments may support language mismatches between server 122-1 and client 180-1 using field value mapping. This feature may be desirable to support international scenarios where a client device 180-1 and server 122-1 are not in the same language. For example, Microsoft Outlook has logic that executes on a task based on the value of a 'Status' field and a 'Priority' field. Server 122-1 may write different values into these fields based on the language of the server. For example, in the English language the Status field can be include expressions such as Not Started', 'Deferred', 'Completed', and so forth. Microsoft Outlook needs to know how to reliably map these values into values it understands. In one embodiment, a mapping section may be added to the schema for the list that Microsoft Outlook can use to map the written values to the values that it understands.

Various embodiments may synchronize structured content types using one or more paging techniques. Some embodiments may support synchronization of very large data sets between server 122-1 and client 180-1 using various paging techniques. To enhance performance for server 122-1 and client 180-1, page requests may be used to get a set of items that have changed in a list. Rather than returning all items that have changed, server 122-1 may return only the last Q items (e.g., the last 100 items). This feature is particularly useful when a client 180-1 may have slower communication connections to server 122-1, or when server 122-1 has thousands or millions of items in a list. The large volume of items may create performance bottlenecks, particularly when synchronizing an Address Book structured content type between Microsoft Outlook on client device 180-1 and server 122-1, for example.

A given paging technique may be implemented in any number of ways. In one embodiment, for example, server synchronization module 120 may be arranged to support a property called 'rowLimit' on a GetListChangesSinceToken web service that specifies a maximum number of items to return. For example 'rowLimit=100' will return the first 100 items that have been updated since the value of the change token. If the property is not specified, all items changed since the change token will be returned.

When the WSS application of server 122-1 receives a request with an item limit, delete operations may be excluded from item limits. A parameter may be passed into a list query to limit the number of items returned to rowLimit. If fewer than this number of items has changed, the updated change token will be returned along with the items. If more than this number of items has changed, however, the change token will not be updated, and the same change token may be returned that was originally passed in. A value for a ListItemCollectionPositionNext may also be returned. Upon receiving a value for ListItemCollectionPositionNext, client device 180-1 should re-query server 122-1 while sending both the change token and this value. Server 122-1 will run a new query to return the next rowLimit number of items from the start of ListItemCollectionPositionNext. This 'If' block may then be re-executed as needed.

It is worthy to note that client 180-1 will need to be sure to process deletions before processing updates. In the event that client 180-1 receives a deletion for an item that it has already deleted, it should suppress the error and move on. In the event that client 180-1 attempts an update for an item that had been deleted on server 122-1, client 180-1 should suppress the error and continue operations.

Various embodiments may provide client 180-1 with alternate URLs that it can use to synchronize with server 122-1 via an internal private network or external public network (e.g., the public Internet). In one embodiment, for example, server synchronization module 120 may generate a first network address to send the synchronization request with at least one structured content type from an internal private network, and a second network address to send the synchronization request with at least one structured content type from an external public network. The first and second addresses may comprise URLs implemented using a hyperlink, for example.

By way of example, server synchronization module 120 may be arranged to pass alternate domain mappings with the returned data in response to a synchronization request. This allows for a scenario where a user navigates to a list inside a private network (e.g., an enterprise intranet) and synchronizes the list to a local application such as Microsoft Outlook. The user then goes home, connects to mail using a remote procedure call (RPC) over the Hypertext Transfer Protocol (HTTP), and expects their SharePoint lists to synchronize as well. If server 122-1 (e.g., a SharePoint site) is also exposed on a public network (e.g., an extranet such as the Internet), then a user could synchronize the lists even if the domain for the URL is different.

The alternate domain mappings may be implemented any number of ways. In one embodiment, for example, alternate domains may be returned in the following order:

[Intranet], [Default], [Extranet], [Internet], [Custom]

These mappings may be returned in the 'AlternateUrls' attribute on a 'listitems' tag. If a mapping does not exist, the same order may be returned with a comma inserted for the missing domain as follows:

(http://intranet, https://default, https://extranet.com,http://custom)

These five alternate domain mappings may all be defined in a central administration. The domain may include just the first portion of the URL, "http://www.microsoft.com" or http://msw, for example. The client application (e.g., Microsoft Outlook) would be responsible for parsing these domains and determining which ones to use based on a state for client device 180-1-s. Generally, client 180-1 should start with the first domain and iterate through the remaining domains in order.

To further improve synchronization operations, various embodiments may improve timing issues regarding when to synchronize a client device with a web site. For example, some embodiments may manage client load by providing recommended synchronization intervals to the synchronization client (e.g., client synchronizes every R minutes). The recommended synchronization intervals may represent a minimum synchronization interval, a maximum synchronization interval, or some value in between. In one embodiment, for example, server synchronization module 120 may generate a synchronization interval parameter. Server synchronization module 120 may send the synchronization interval parameter to client 180-1. Server 122-1 may receive synchronization requests from client 180-1 in accordance with the synchronization interval parameter.

Using recommended synchronization intervals may provide several advantages. The use of recommended synchronization intervals may improve scale so that a large number of Microsoft Outlook clients (e.g., 100,000) would not render a SharePoint server farm (e.g., computing array 140) unusable. For example, assume Microsoft Outlook has a default synchronization interval that causes a client device 180-1 to synchronize each structured content list every 60 minutes. Assuming each user will eventually add up to 10 synchronized lists, the total number of hits against server 122-1 may reach 10*24*100,000 each day, which works out to approximately 278 hits per-second 24 hours a day. Really Simple Synchronization (RSS) feeds which synchronize approximately every 60 minutes may further exacerbate this problem.

Various techniques may be used to reduce the work load on a given server 122-1-*n*. In one embodiment, for example, modified times for a cache list and/or site may be implemented on the front end. If a request comes to server 122-1 asking for changes since the last cached list or site modified time, server 122-1 will know that there have been no changes and can avoid querying databases 124, 126 at all. The cache may need to be expired at some regular interval, such as approximately every 5 minutes, for example. The number of lists or sites that are cached may need to be limited to accommodate memory resources, such as approximately 100 list and/or sites, for example.

Another technique to reduce work load on a given server 122-1-*n* may be to implement a date/time adaptive synchronization technique. Server synchronization module 120 may reduce a number of synchronization requests made by a given Microsoft Outlook client by sending client device 180-1 a synchronization interval parameter that changes based on an estimation of the probability of the next list change time utilizing historical list change data factoring in date/time information such as work hours, evening hours, and weekends.

In various embodiments, the recommended synchronization intervals may be based on historical content change data stored on the server. In one embodiment, for example, server synchronization module 120 may generate a synchronization interval parameter for client 180-1 based on historical content change data stored by server 122-1. Server synchronization module 120 may send the synchronization interval parameter to client 180-1.

One example of a technique based on historical content change data may be referred to as a grid-based adaptive synchronization ("grid synchronization"). Each list on a SharePoint server has different use characteristics. A number of factors may affect list usage and hence update frequency. Examples of such factors may include a list type, site type, size of list, amount of list customization, number of site users, geographic location and distribution of users, total number of visits to site, time of day, the current place in the cycle of the site's project (e.g., beginning, middle, end, or archive), and so forth. A number of these factors are configuration based, and estimates about usage patterns may be made based on this data. A number of these factors, however, are also time-based. Time-based factors may have significant impact on usage patterns. Sites are typically cyclical in nature, and a web site is rarely used at the same rate in perpetuity. Furthermore, people tend to work on schedules. Therefore, the amount of work that happens from 10 pm to 6 am is usually less than the amount that happens between 9 am and 5 pm, even though each time period comprises 8 hours. People also tend to not work on weekends. It is worthy to note that the nature of the work and the geographic distribution of the work can influence these factors, and therefore it may be important to adapt to usage patterns rather than trying to hardcode them in advance. Proposals that will have the most dramatic impact on reducing the number of requests to the server while still meeting user expectations need to involve time-based algorithms, and need to be sensitive to the way in which people work and thereby use a given site.

From this perspective, one design consideration is to provide client device 180-1 with a recommended time that it should next perform synchronization operations. Client device 180-1 should only synchronize with server 122-1 when there has been a change on either client device 180-1 or server 122-1. Consequently, a probability analysis may be used to determine an ideal synchronization interval. An administrator can adjust the behavior of network 100 in an intelligent way by adjusting the threshold of probability at which they want client devices 180-1-s to re-synchronize. For example, the server administrator could adjust the probability threshold to cause a client device 180-1 to synchronize when there is a 10% chance of the content being updated. If that generates too much server load, the administrator could adjust the threshold to a 50% probability threshold. The administrator may continue refining this process until network performance is within acceptable parameters.

In some cases, a probability threshold for future list usage may be based on historical usage data. A list may comprise, for example, a collection of data or items of one or more structured content types. Usage often follows patterns. People are naturally creatures of habit, and structured work environments often encourage this further as it creates predictability. To represent past usage, time may be divided into a grid. Assuming a time period of a week, a y-axis may have the days of the week, while an x-axis may have hours per day. In each cell of the grid, a Boolean value may be set indicating whether or not the list was updated during that time period, where a '1' value represents that the list was modified during this period and a '0' value represents that the list was not modified during this time period. For example, looking at the Monday row, and the 9:30 am-9:40 am cell, if the value in the cell is '1' then the list was modified on Monday sometime between 9:30 am and 9:40 am. The next '1' might not be till Monday from 3:10 pm-3:20 pm. Moving ahead, monitoring site usage for a week provides a completed grid. The grid will have more 1 values if a list was updated more frequently, and more 0 values if a list was updated less frequently. Assume a client device 180-1 synchronizes with server 122-1 on Monday at 9:05 am. After running a query to see if anything changed, server 122-1 now needs to make a recommendation to client device 180-1 as to when it should perform its next synchronization event. Analyzing the historical data, it appears that an update occurred on Monday between 9:30 am-9:40 am. Based on this historical data, server 122-1 may instruct client device 180-1 to perform its next synchronization between 9:30 am-9:40 am. Algorithmically this may be achieved by traversing the grid until a 1 value is reached. For each cell passed, the cell time size may be added to the recommended time between synchronizations. In this example, the 9:00-9:10 cell, the 9:10-9:20 cell, and the 9:20-9:30 cell were passed. Server 122-1 may therefore return a recommended synchronization interval of 30 minutes.

At this point, the 9:30-9:40 am recommendation is merely a starting point. Longer periods of time will refine the recommendation. Continuing with the previous example, assume that the list was updated at 9:22 am the second week. During the third week, client device 180-1 once again performs synchronization with server 122-1 at 9:05 am and server 122-1 needs to make an updated recommendation. Traversing the grid, there is a 1 value in the 9:20-9:30 am cell, and a 1 value in the 9:30-9:40 am cell. The grid algorithm begins at the current cell and adds 10 minutes with each cell pass until a cell that has a 1 value is reached. The 9:00-9:10 am cell is passed, and the 9:10-9:20 am cell is passed. Server 122-1 may now return a value of 20 minutes to client 180-1. Based on historical evidence, however, a probability may be generated to indicate whether the list would have been updated in 20 minutes. In two possible Mondays from a starting time of 9:05 am to a finishing time of 9:30 am, the list was updated only on one Monday. Based on this historical data, the probability may be calculated as ½ or 50%. Ten minutes may be added to the recommended synchronization interval, and the probability analysis may be executed again. With two Mondays of data from a starting time of 9:05 am to a finishing time of 9:40 am, the list was updated two times. The probability for 30 minutes is therefore ½+½=2/2 or 100%. Using more data results in refined recommendations. It now becomes an informed decision of how often the server administrator is comfortable with client devices 180-1-s requesting information from servers 122-1-n versus how important it is that users immediately have the most up-to-date data. If the server administrator sets the threshold at 50% or less, for example, then server 122-1 would return a synchronization interval of 20 minutes. If the threshold was set between 50-100%, however, then the server would return a synchronization interval of 30 minutes.

A generalized algorithm to generate a synchronization interval may be illustrated as follows:

P is probability

T is user defined threshold

S is the time span of each cell, in the example above this is 10 minutes

C is the current cell count,

G[ ] is the grid, assume G[0] represents value at current time

M is the max value for the cell in the grid, in the example above this is number of weeks.

P=0;

For(C=0;P<T;C++)

P=P+G[C]/M;

return C*S

It is worthy to note that the return value does not have to be recalculated with each client request. Rather, it can be cached for a period of time and is considered valid until the next time interval starts. In the above example that would be up to 10 minutes.

To build the actual grid, each time an item is modified, the last modified time of the list is checked. If the last modified time of the list occurs in the same time span as the current time, then no change needs to be written. For example, two changes that happen in the same time period between 9:00 am and 9:10 am only require 1 update. This keeps the number of writes to a minimum, helping with lock contention and scale. If the last modified time of the list occurred in a different time span than the current time, the value in the current time span cell may be incremented by "1." In some cases, the modified time for the list needs to be updated as well, although WSS Version 3.0 already handles this.

The grid algorithm is scalable in many dimensions based on how much data can be stored, and what trends are common in usage of a particular application. In the x direction, the time span of each cell could be reduced to a minute, or lengthened to an hour or more. In the y dimension, the grid could be expanded to include a different row for each day of a month, or the grid could be collapsed to just one row representing one day. In fact it can be collapsed in a slightly more intelligent fashion by having two days, where one represents a weekday and the other represents a weekend-day. If the grid is representing 12 hour shift work, the grid may have y rows, each representing a 12 hour shift from start to end.

As previously mentioned, site usage typically follows predictable cycles. These cyclic periods often change slowly over several months. To refine the grid algorithm, recent data may be a better indicator than older data. For example, a list update that happened on a Monday 6 months ago typically has less value than one that happened yesterday. Consequently, the grid algorithm may be refined by maintaining larger sets of data and applying functions to weight data within the larger set differently based on time. Alternatively, memory resources may be used more effectively by expiring old data. For example, assume the grid is reset every 8 weeks. In the grid defined in the previous example above, the maximum value in each cell would be 8. Each cell may therefore be represented with just 3 bits.

Resetting the grid, however, also removes data which may affect the grid algorithm results. This problem can be mitigated by creating two grids that are offset from each other by a period of time. For example, a first grid may start recording data at Week 1, while a second grid may start recording data at Week 4. At this point, server synchronization module 120 may use the first grid for the probability calculations. At Week 8, the first grid may be reset, and server synchronization module 120 may switch to use the second grid to perform the probability calculations. Server synchronization module 120 may begin recording in the first grid again. In this way, server synchronization module 120 can continually rotate from one grid to the next, never having to start from scratch. In this case, the discontinuity in dataflow occurs in 4 week intervals. Depending on the importance of smoothness, this could be reduced by adding more grids. For example, 8 grids would result in more minor discontinuities of 1-week each. Note that this system could also be used to give more power to more recent events by using multiple grids to generate the probability.

To further improve performance of the grid algorithm, a maximum and minimum synchronization interval may be set. The minimum synchronization interval should likely be defaulted to the size of a cell span, which in the example above would be 10 minutes. The size of the maximum interval depends on a confidence level in the system. Both should be configurable by the administrator along with the threshold. These values can be adjusted to refine the system during use, although it could be cumbersome to change the grid structure (e.g., the representation of time on the x-axis and y-axis) after it is already in use. A default time should be set for initial synchronizations until the grid is populated to a minimum usable state.

This approach is applicable to other synchronization protocols such as RSS. It is also applicable to areas such as search crawlers, indexers, and proxy servers that cache content. While the grid algorithm can be implemented on a client, the accuracy would most likely be reduced since a client would be unaware of all changes made on the server. The grid algorithm can also be used in client-to-client synchronizations. It can also be used in conjunction with notification based synchronization approaches, where notifications handle rarely changing content, and this system handles more frequently changing content.

The grid approach may have varying affects on memory resources depending upon a given implementation. Estimations of data storage may be made as follows:

20 minute spans
7 distinct days
8 weeks per-table
2 tables
=378 bytes
10 minute spans
2 rows (weekday/weekend)
6 weeks per-table
2 tables
=288 bytes In addition to generating recommended synchronization intervals based on historical data, the recommended synchronization intervals may also be based on results of previous synchronization requests from the client. In one embodiment, for example, server synchronization module 120 may generate a synchronization interval parameter for a client based on previous synchronization results from previous synchronization requests by client 180-1. Server synchronization module 120 may send the synchronization interval parameter to client 180-1.

By way of example, server synchronization module 120 may perform function-based adaptive synchronization to generate a synchronization interval parameter. The number of synchronization requests made by a given Microsoft Outlook client may be generated using some form of exponential decay/growth function. For example, take the last synchronization interval. If a change has occurred, decrease the time interval by an exponential function. If a change has not occurred, however, increase the time interval by an exponential function.

Other techniques may also be used to generate a synchronization interval parameter. For example, a last modified adaptive synchronization technique may be used. This technique reduces the number of synchronization requests made by a Microsoft Outlook client by sending client 180-1 a synchronization interval that changes strictly based on the last modified time for a list. For example, if the list was modified within the last hour, synchronize again in 20 minutes. If the list was modified more than an hour ago but less than a day ago, synchronize again in 2 hours. If the list was modified more than a day ago, synchronize again in one day. In another example, a single-query for multiple lists technique may also be used. This technique reduces the number of synchronization requests made by a Microsoft Outlook client by allowing a client 180-1 to make one request that passes all the list GUIDs of interest at one time. The last modified times may be batched checked for all these lists, and then server synchronization module 120 may inform client device 180-1 as to which lists to explicitly synchronize. In yet another example, an e-mail notification-based synchronization technique may be used. Current synchronization techniques may use various polling techniques, where a client polls a server on a regular or semi-regular basis. In one embodiment, server 122-1 may notify a client 180-1 that a synchronization event is needed by sending a "hidden e-mail alert." This would leverage on existing alerts infrastructure. The alert would not necessarily be seen by the user, and it would automatically be created in SharePoint at the time the user chooses to perform synchronization operations. This may be particularly effective for infrequently changing lists. Client device 180-1, however, would need to support the receipt of incoming mail requests in order to implement this particular technique.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method for synchronizing structured web site contents, the method comprising:
transmitting, by a client device, a request for a server content list, wherein the server content list comprises one or more structured content types supported by a server device, and wherein the one or more structured content types comprise one or more from the group consisting of: calendar, contact, discussion, document, and tasks;
receiving, by the client device, the server content list;
comparing the server content list with a client content list, wherein the client content list comprises one or more structured content types supported by the client device;
identifying, by the client device, one or more structured content types shared by the client device and by the server device;
transmitting, by the client device, a first synchronization query to synchronize the one or more shared structured content types, wherein the synchronization query comprises a change token and a maximum number of items to be returned, and wherein the items to be returned are the items that have changed since a value of a change token, and wherein the first synchronization query uses a paging technique;
when more than the requested maximum number of items has changed:
receiving, by the client device, a first number of items up to the maximum number of items and the change token;
receiving, by the client device, a value for requesting a next number of items up to the maximum number of items from a start of the value; and
transmitting, by the client device, a second synchronization query, wherein the second synchronization query comprises the change token and the value, and wherein the second synchronization query uses the paging technique.

2. The method of claim 1, wherein the maximum number of items comprises a "rowLimit" property.

3. The method of claim 1, wherein the paging technique is used when the client device has decreased communication connections to the server device.

4. The method of claim 1, further comprising:
receiving, by the client device, a synchronization interval parameter, wherein the synchronization interval parameter is based on historical content change data.

5. The method of claim 4, wherein the historical content change data is based on a grid-based adaptive synchronization.

6. The method of claim 5, wherein the grid-based adaptive synchronization is based on one or more factors from the group consisting of: list type, site type, size of list, amount of list customization, number of site users, geographic location, and distribution of users.

7. A computer implemented method for synchronizing structured web site contents, the method comprising:
receiving, by a server, a client content list from a client;
retrieving a server content list;
comparing, by at least one processor at the server, the client content list and the server content list;
determining structured content types supported by the client and by the server;

generating a shared content list based on the determination of structured content types supported by the client and by the server;

sending the shared content list to the client;

receiving, from the client, a request to synchronize one or more structured content types in the shared content list, wherein the request comprises a limit on a number of items to be returned; and performing one or more synchronization operations based on the received synchronization request, wherein the received request with the item limit causes the server to pass a parameter into a list query to limit the number of items returned to the item limit, and wherein any delete operations are excluded from the item limit.

8. The method of claim 7, wherein the synchronizing comprises a paging technique.

9. The method of claim 7, further comprising:

sending a synchronization interval parameter, wherein the synchronization interval parameter is based on historical content change data.

10. The method of claim 9, wherein the historical content change data is based on a grid-based adaptive synchronization.

11. A system for synchronizing structured web site contents, the system comprising:

at least one processor; and a memory coupled to the at least one processor, the memory comprising computer-program instructions executed by the at least one processor for:

transmitting, by a client device, a request for a server content list, wherein the server content list comprises one or more structured content types supported by a server device, and wherein the one or more structured content types comprise one or more from the group consisting of: calendar, contact, discussion, document, and tasks;

receiving, by the client device, the server content list;

comparing the server content list with a client content list, wherein the client content list comprises one or more structured content types supported by the client device;

identifying, by the client device, one or more structured content types shared by the client device and by the server device;

receiving, by the client device, a synchronization interval parameter, wherein the synchronization interval parameter is based on historical content change data;

transmitting, by the client device, a first synchronization query to synchronize the one or more shared structured content types, wherein the synchronization query comprises a change token and a maximum number of items to be returned, and wherein the items to be returned are the items that have changed since a value of a change token, and wherein the first synchronization query uses a paging technique;

when more than the requested maximum number of items has changed:

receiving, by the client device, a first number of items up to the maximum number of items and the change token;

receiving, by the client device, a value for requesting a next number of items up to the maximum number of items from a start of the value; and transmitting, by the client device, a second synchronization query, wherein the second synchronization query comprises the change token and the value, and wherein the second synchronization query uses the paging technique.

12. The system of claim 11, wherein the historical content change data is based on a grid-based adaptive synchronization.

13. The system of claim 12, wherein the grid-based adaptive synchronization is based on one or more factors from the group consisting of: list type, site type, size of list, amount of list customization, number of site users, geographic location, and distribution of users.

14. The system of claim 11, wherein the maximum number of items comprises a "rowLimit" property.

* * * * *